United States Patent [19]

Kanigowski

[11] Patent Number: 5,350,217
[45] Date of Patent: Sep. 27, 1994

[54] DIAMOND SHAPED ARMRESTS FOR AIRLINE PASSENGER SEATS

[75] Inventor: Andrew S. Kanigowski, La Crescenta, Calif.

[73] Assignee: Futureflite Corporation, Carson City, Nev.

[21] Appl. No.: 841,335

[22] Filed: Feb. 25, 1992

Related U.S. Application Data

[63] Continuation-in-part of Ser. No. 764,374, Sep. 23, 1991, abandoned.

[51] Int. Cl.$^5$ ............................ A47C 7/54; B60N 2/46
[52] U.S. Cl. .................. 297/411.2; D6/501; 297/194; 297/466
[58] Field of Search ............... 297/411, 412, 417, 464, 297/466, 115, 194; D6/501, 502

[56] References Cited

U.S. PATENT DOCUMENTS

| | | | |
|---|---|---|---|
| D. 313,963 | 1/1991 | Gunnarsson et al. | D6/501 |
| 1,802,620 | 4/1931 | Scully | 297/113 |
| 2,419,412 | 4/1947 | McArthur | 297/194 |
| 3,893,729 | 7/1975 | Sherman et al. | 297/118 |
| 3,926,473 | 12/1975 | Hogan | 297/411 |
| 4,730,867 | 3/1988 | Cluba | 297/411 |
| 4,881,702 | 11/1989 | Slettebak | 297/232 |

FOREIGN PATENT DOCUMENTS 0166870 1/1986 European Pat. Off. ............ 297/411
377253 6/1922 Fed. Rep. of Germany ...... 297/417

*Primary Examiner*—Peter M. Cuomo
*Assistant Examiner*—Darnell M. Boucher

[57] ABSTRACT

The functional and aesthetic aspect of the original redesign of inboard wall surfaces on airline passenger seat armrests. The new armrest cross-section contours are introduced instead of the prior art rectangular section shape with vertical side walls near the front end of the armrest. The new sections resemble a semi-diamond shape for the outboard armrests and full diamond shape for the center armrests. The new section contour changes the flat, vertical wall (10) located near upper end of armrest and between the front end (22) and midsection (24) of armrest. The new surface is comprised of a sloping wall (14) starting near the upper edge (12) and diverging from the original vertical wall (10), then the direction changes at the edge (16) to run on another slope (18) toward the original wall (10) and passes thru to form a substantial round cutout (20) behind the surface of the original vertical wall (10) of the prior art armrest. The new contour provides more legroom, measured in the lateral direction, and provides substantially wider armrests at the top surfaces without increasing overall width of the airline seats. Additionally, the Passenger Control Units (30) (PCU) are also better exposed, more accessible and are easier to operate when located on this sloping wall surface (14).

7 Claims, 10 Drawing Sheets

DIAMOND SHAPED ARMRESTS FOR AIRLINE PASSENGER SEATS

REFERENCE TO RELATED APPLICATIONS

This is a utility patent application is a continuation-in-part which is based upon the disclosure including the functional and structural description contained in my patent application Ser. No. 07/764,374 filed Sep. 23, 1991 now abandoned.

BACKGROUND - FIELD OF INVENTION

This patent application covers a new and original design of shape, both functional and ornamental, for an article of manufacture. This invention relates to the armrests of the type commonly employed on airline passenger seats. More particularly, this invention involves the unique shape of armrest side walls in the area of interface between the passenger and the armrest.

BACKGROUND - DESCRIPTION OF PRIOR ART

Airlines use basically three types of passenger seats: Tourist, Business and First Class seats. These seats exist commonly in double or triple seat configuration. Some tourist class seats exist in quad or quint configurations.

Typically, tourist class seats have very narrow armrests and narrow bottom cushions to accommodate a maximum number of passengers in a limited aircraft cabin width, wall-to-wall. Similarly, the same situation exists in most business class seats where armrests and bottom cushions are only slightly wider than in tourist class. Only first class seats offer passengers more comfortable accommodations with wide armrests and wide bottom cushions.

The width of airline seats is dependent on the aircraft type and the required minimum aisle width. Most of the airlines want to pack the maximum number of passengers into a limited cabin cross section. This results in narrow armrests and narrow seat bottom cushions when available space is divided between the number of passengers sitting closely, side by side. In other words, the arithmetic calculation of all armrests, bottom cushions and aisle width dimensions cannot add up to a number larger than the overall dimension of the cabin width.

Airlines typically buy the seats directly from suppliers, not the aircraft makers. Seat designers and manufacturers work to satisfy the airline dimensional limits. In turn, the width of the seat armrests and the width of the seat bottom cushions are often not negotiable and are fixed by the airline and/or aircraft specification. Consequently, overall comfort and appearance of the airline seat is directly related to dimensions imposed on the designer by the airline customer.

Unfortunately, because of this airline industry practice all existing seats look alike when their front views are compared. Most of the seat armrests of the prior art usually have vertical walls on the sides interfacing with the passenger. Sometimes this wall is concave or removed in the rear hip area to create more room. However, the forward portion of the inboard wall, in the area of passenger knee, is flat and vertical on current armrest designs. Typically, a seat back recline adjustment button or Passenger Control Unit (PCU) is installed on this flat vertical wall.

As shown in submitted drawings of the prior art, a typical airline armrest has the appearance of a box in the front view. Forward cross-section of each armrest forms a rectangular shape with vertical sides. A small joggle or bevel (if any) is the only ornamental feature found on this rectangular section type armrest. Some center armrests in the first or business class seats are supported underneath by a center post forming effectively a T-section. This look can be best described as the rectangular box on a stick. Further examples of this T-armrest can be found in U.S. Pat. No. 4,881,702 November 1989 by R. Slettebak, U.S. Pat. No. 3,893,729, July 1975 by G. Sherman et al, or U.S. Pat. No. 2,419,412, April 1947 by W. McArthur. In case of the Sherman patent, the center armrest is also convertible with a wide top tray being able to plug in place during a conversion to a more comfortable, wider seat.

Accordingly, the main disadvantage of the prior art is that the armrest looks and feels narrow, especially at the typical two-inch width on present tourist class seats. While this width may be sufficient on the outboard armrest, it is not enough on the center position where two passengers must share a single armrest located between them. In addition, the vertical side wall is not comfortable when in contact with the curvature of the passenger legs causing local pressures during long flights. This effect is even worse when legs are pinched above knees by the front/lower corners of armrest.

One more disadvantage is very poor exposure of the seat Passenger Control Unit (PCU) when installed on the vertical armrest wall surfaces. These units face toward legs not toward the eyes of passenger in existing airline seats. The newest solution of this problem is by relocation of the PCU to the top surface of the rectangular armrest in recently introduced new airline seat models. This new top location is at the expense of the ashtray which is removed from this area and may confuse two passengers when a single PCU unit is equally accessible by both of them.

SUMMARY OF THE INVENTION

This design innovation is related and directed to the side wall of the armrest. More particularly, it is related to the inboard side wall surface of the airline seat armrest in the area of interface between the passenger and the armrest. This design innovation may be used with most armrest internal structures. As shown on submitted drawings, the new design changes the existing rectangular cross-section shape to a diamond and semi-diamond shape cross-sections when vertical inboard walls are modified. Please refer to FIGS. 1, 3, 4, 5B, 6B, 7B, 8B for better understanding of the diamond and semi-diamond shape concept.

BRIEF DESCRIPTION OF DRAWINGS

In the drawings, closely related figures have the same number but have different alphabetic suffixes. Suffixes are mostly used for the purpose of comparison of this invention with the equivalent prior art.

DESCRIPTION OF THE PREFERRED EMBODIMENT

Figure 1:
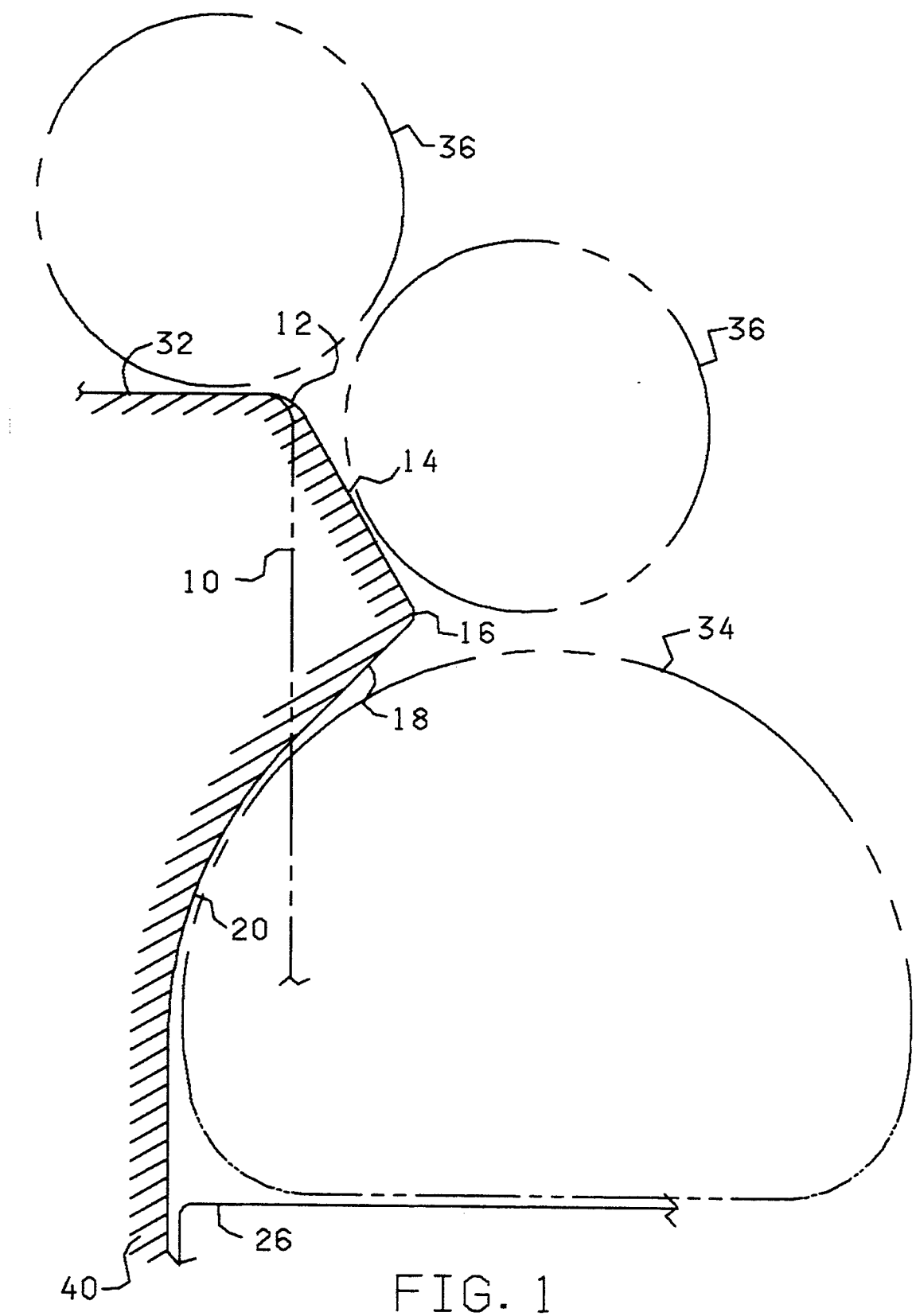
FIG. 1 shows the new contour of the airline seat armrest cross-section in the area between front end and midsection of armrest (preferred embodiment).
Figure 2:
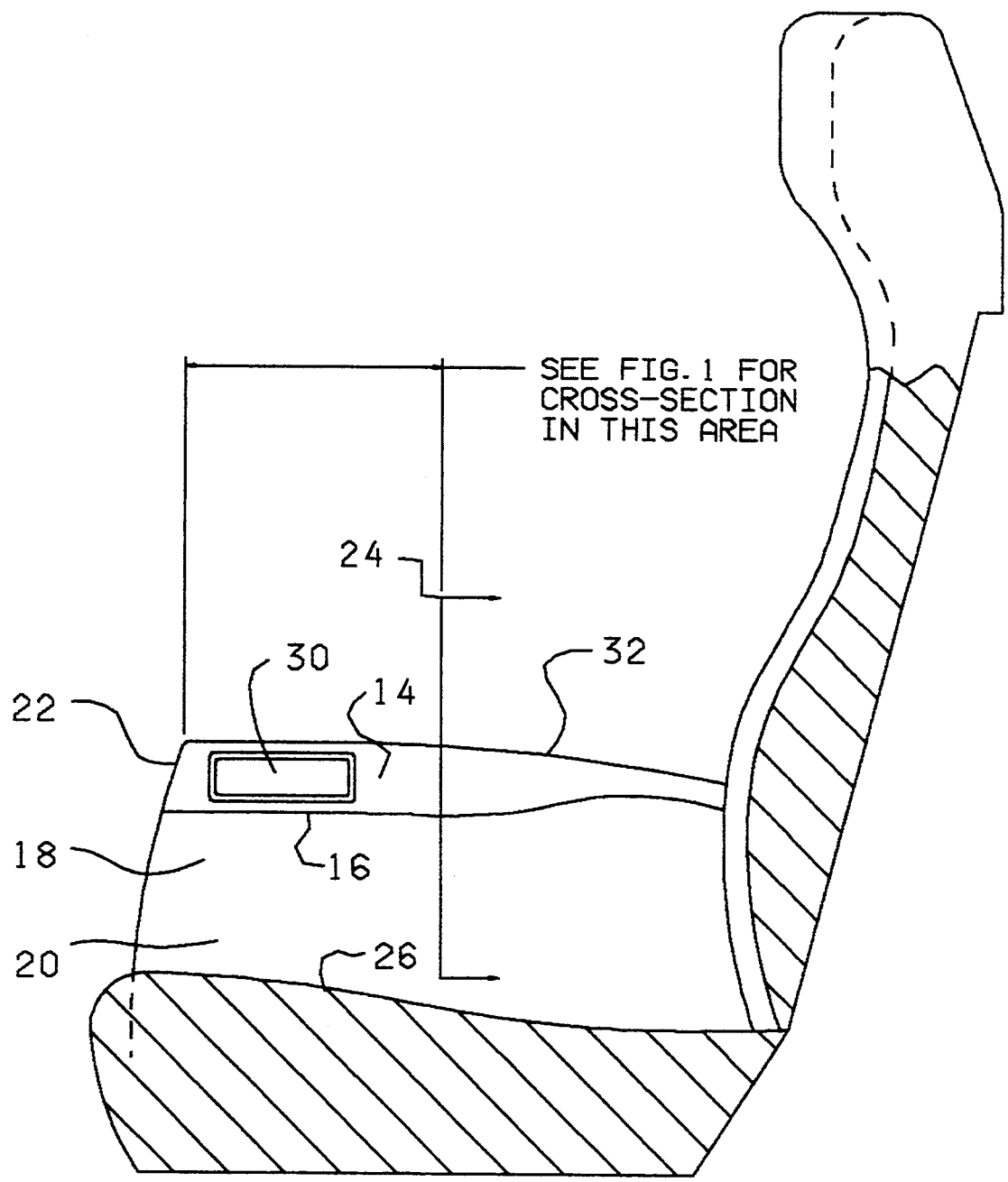
FIG. 2 shows side view of inboard wall of the airline seat armrest to indicate location of the new section shown in FIG. 1. Side view contour of armrest is not relevant here.
Figure 3:
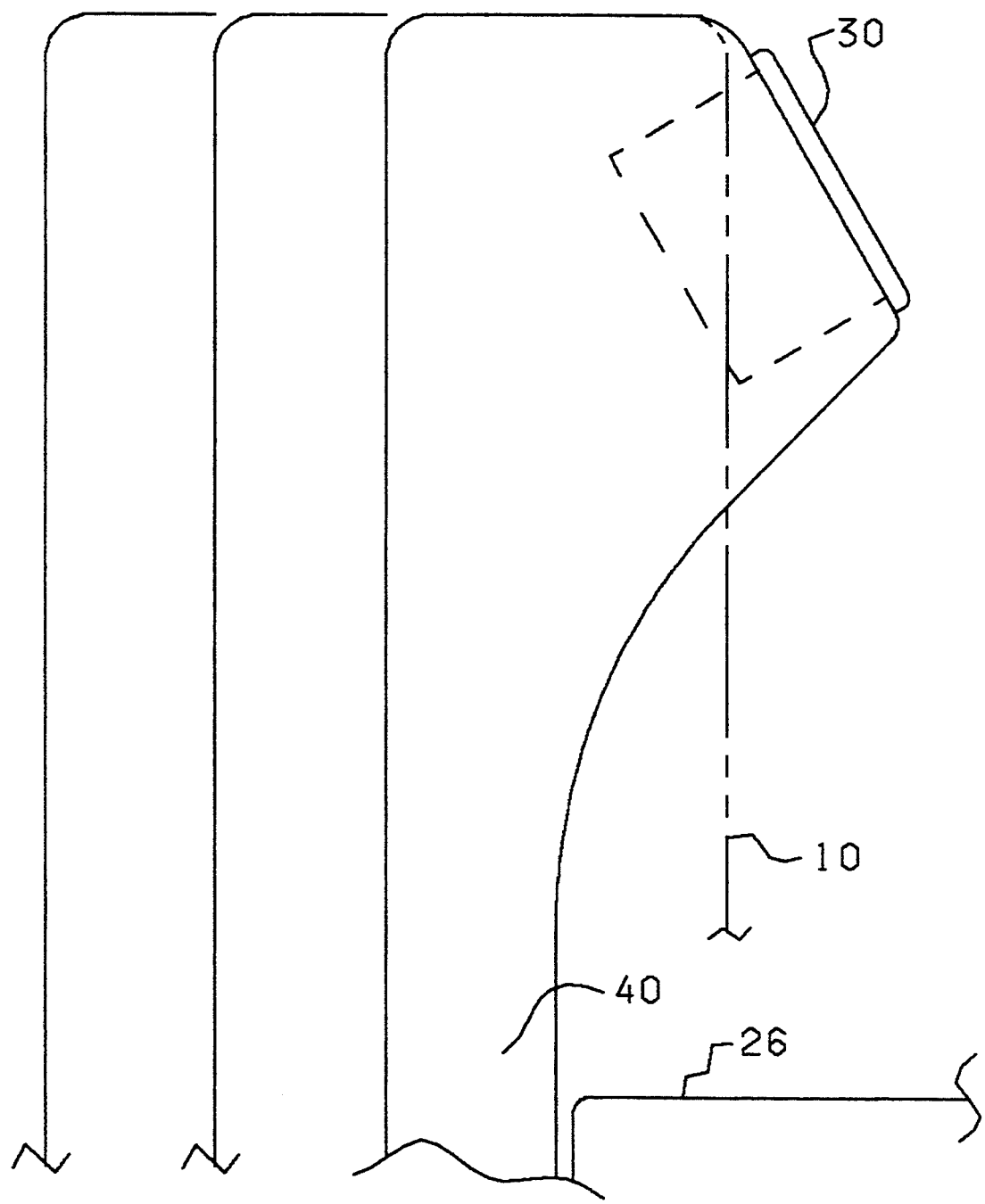
FIG. 3 shows front views and the new contour of the outboard armrest in tourist/business/first class seats (semi-diamond shape of outboard armrests).

The new diamond and semi-diamond shapes are accomplished by redesign of the previous flat, vertical inboard wall 10 (FIG. 1) in the forward area of armrest between its front end 22 (FIG. 2) and midsection 24 of armrest. Starting at the top edge 12 (FIG. 1) the new wall is not vertical, instead, it runs on approximately 45 to 60 degree slope 14 toward center of the passenger leg 34. The direction then changes at edge 16 into another sloping surface 18 which is generally tangent to passenger leg 34. After reaching tangent area the new wall enters a smooth curve 20 in the downward direction.

This curved shape 20 follows closely the natural curvature of the passenger leg 34 above knee. For better understanding, the reader may assume the most comfortable position in his/her chair, place palms of hands on the top of legs above knees and then slide hands downward/out. This manual exercise permits to feel the essential curvature of the new armrest shape which is not found in the current airline seats.

Figure 4:
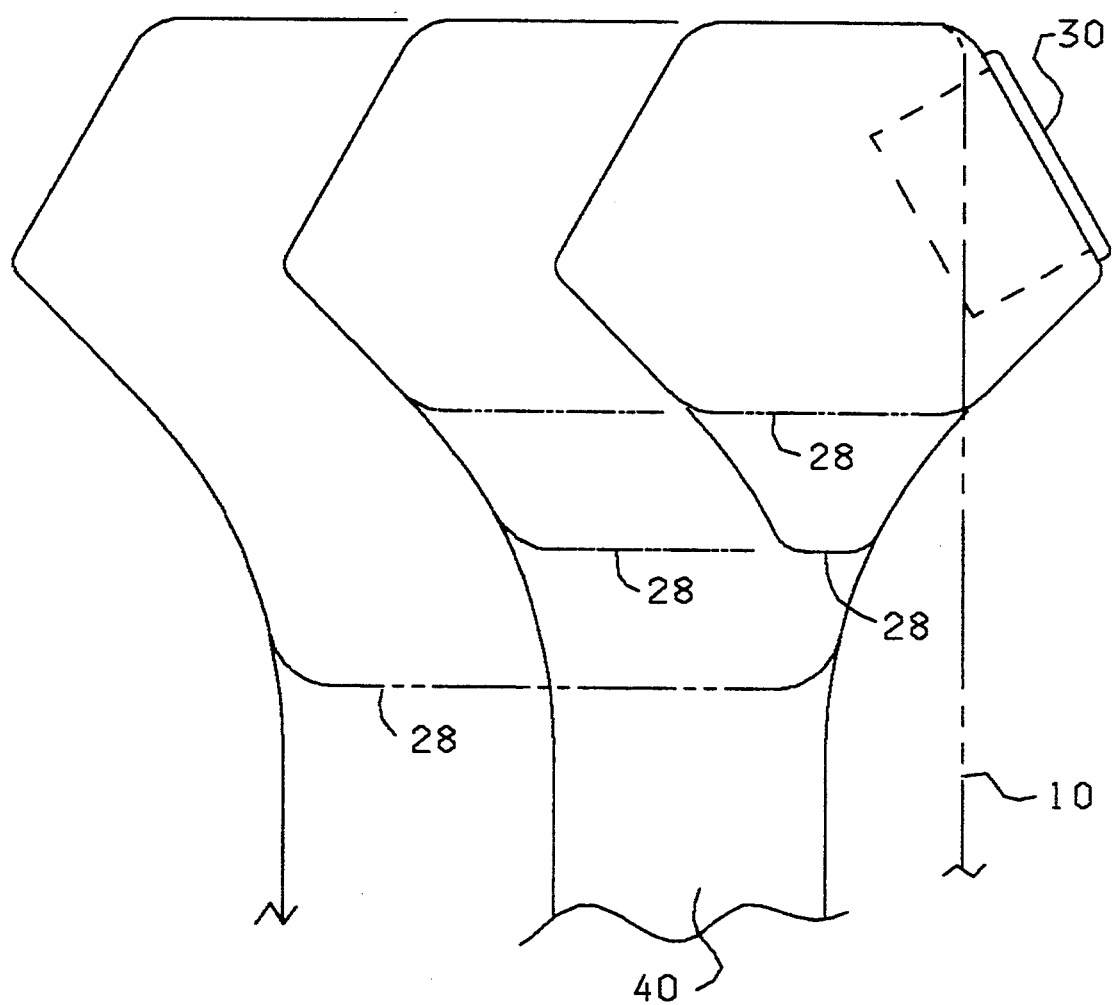
FIG. 4 shows front views and new contours of center armrests in tourist/business/first class seats (full diamond shape of center armrests).

Smoothly curved shape 20 forms a substantial round cutout reaching approximately one inch behind the original vertical wall 10 of the old flat armrest of previous design. This cutout is also well above the previous small joggles which are sometimes found on the armrest wall near the seat bottom cushion level 26. At the point near the top of the seat bottom cushion level 26 (FIG. 1, 2, 3) the new wall drops vertically below the cushion. This is in case of armrest with the bottom support structure 40 (one which is supported underneath). In the case of armrest with rear attachment or with fold-up capability, having a rear pivot 42 (FIGS. 5C, 5D), the new contour may be terminated above the seat cushion at any level 28 as shown on FIG. 4.

Such constructed diamond shape of the new design is for both functional and aesthetic reasons. The new armrest is therefore wider at the top and narrower at the bottom. This new shape delivers more comfort and enhances the appearance. The new shape of the armrest side walls provides approximately two inches more legroom for each passenger place (measured between armrests at the center of leg level) when compared to previous designs of the rectangular shape. Please compare FIGS. 5A and 5B, 6A and 6B, 7A and 7B.

Also, the effective width of the new armrest in the upper armcap area is increased by approximately two inches (one inch per side). That means a four-inch wide center armrest instead of the previous two-inch wide armrests on typical tourist class seats. This wider dimension of the armcap is in the forward and center area, not in the rear area where width of the armcap shall be smoothly tapered to clear the hips of the seat occupant (see FIGS. 5D, 6D).

Please note that the above increases in the width of armrests and legroom are accomplished without any change in the overall width of the seat as shown on FIGS. 5, 6, 7, 8. This new armrest shape provides two or three positions for support of the passenger arm 36 as shown on FIGS. 1 and 5B. The passenger may rest his forearm 36 on the top surface 32 (shared with the adjacent passenger) or on his side of the sloping sidewall 14 as shown on submitted drawings. Viewing and operating the PCU controls 30 (FIGS. 2, 3, 4, 5D, 6D) located on a better exposed slope 14 is also enhanced significantly, compared to the prior art armrest with the PCU located on vertical side wall.

SUMMARY, RAMIFICATIONS, AND SCOPE

A review of current airline cabins shows that the flying public and airline interior designers are clearly accustomed to the rectangular section armrests with vertical side walls on the sides interfacing with the passenger. Existing ornamental features in the form of small bevels or joggles (if any) on the traditional rectangular armrest box are well short of the substantial sloping surface and deep cutout introduced by the new invention contour. Previous corners and edges are positioned in such a way that they only produce uncomfortable pinching on passenger legs.

The novel features of the new design are different from this rectangular section armrest. For the best results, the new diamond and semi-diamond shape contours shall be designed into the middle and forward portions of the airline seat armrests (not in the rear hip area). The sloping surface near upper edge shall run on approximately 60 degrees slope for the best exposure and access to the PCU. This slope shall extend for approximately one inch inboard from the original flat, vertical wall (one inch toward the passenger).

The deep round cutout positioned below the above described upper slope shall follow external curvature of leg of the comfortably sitting passenger. This round cutout shall reach approximately one inch outboard and behind the original flat, vertical wall (as shown on FIGS. 1, 3 and 4). Such arranged armrest side wall profile resembles unique semi-diamond shape or full diamond shape when it is applied on both sides of the new armrest.

Changing the shape from a straight vertical wall to a sloping and curved surface produces quite unexpected and surprising results. Each armrest looks and feels wider and the seat bottom cushions look and feel wider too. Thus the comfort and appearance of the whole seat is upgraded when compared to the previous seats. Consequently, the new tourist class seat is upgraded to the parameters of the existing business class seat, and the new business class seat is upgraded to the level of the existing first class passenger seat.

Figure 5A:
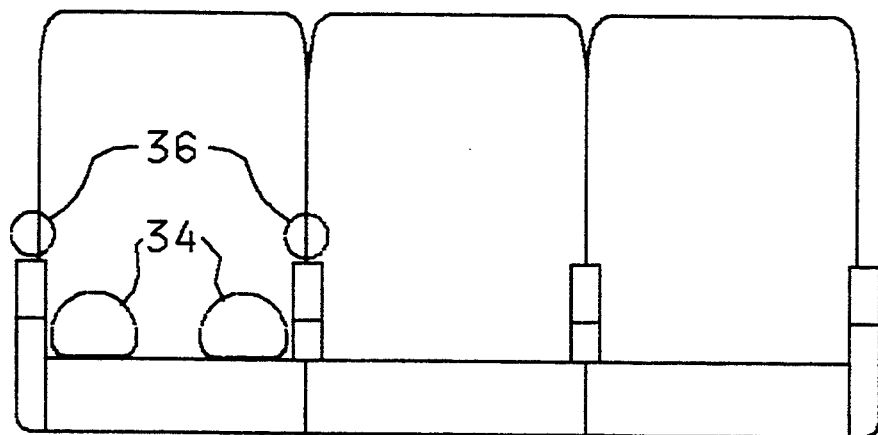
FIGS. 5A and 5B show front view of traditional previous art and new armrests installed on typical tourist class seats of identical overall width (comparison).
Figure 5B:
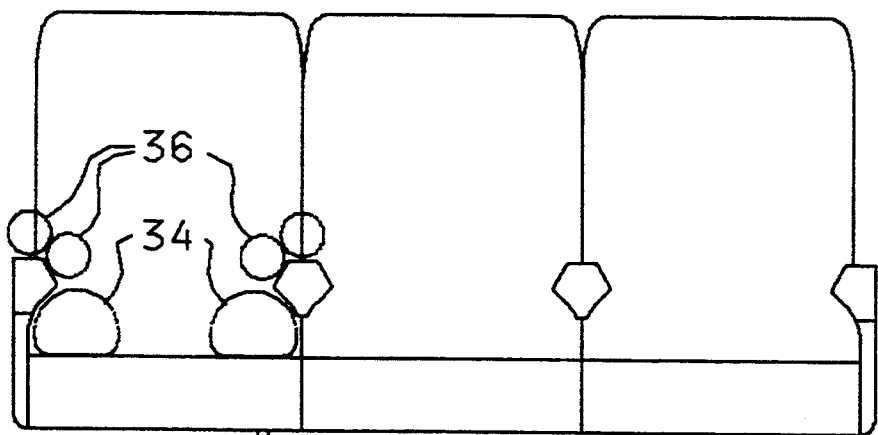
Figure 5C:
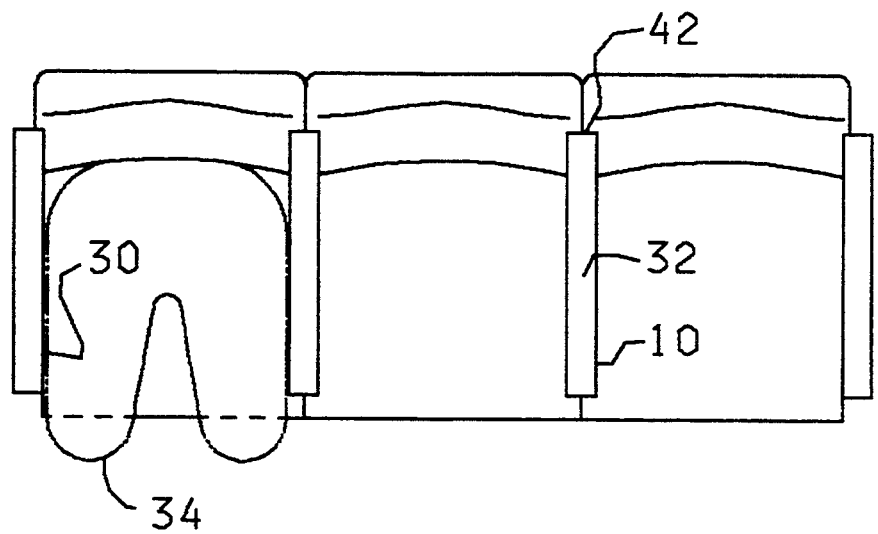
FIGS. 5C and 5D show the top view of traditional previous art and new armrests installed on typical tourist class triple seats (comparison).
Figure 5D:
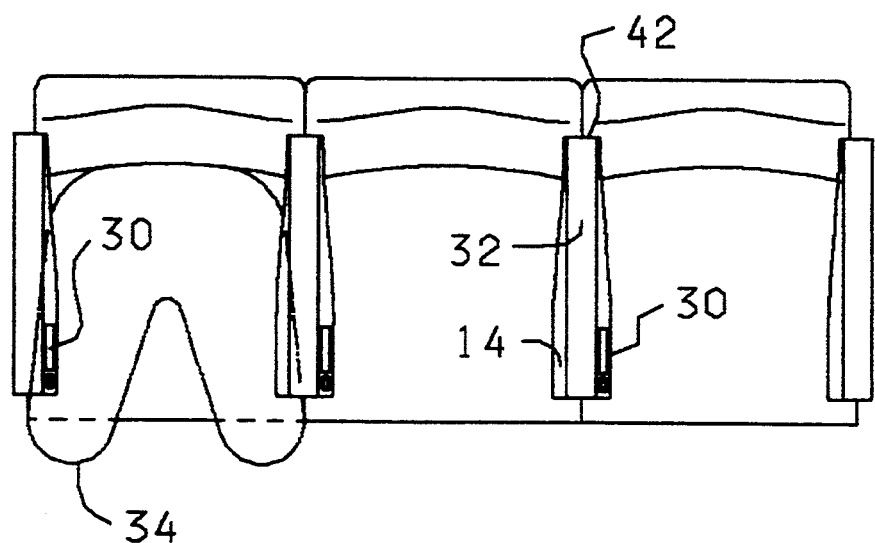
Figure 6A:
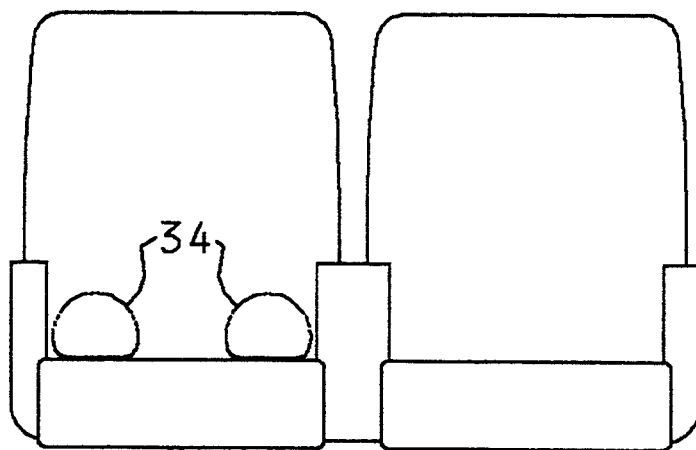
FIGS. 6A and 6B show front view of traditional previous art and new armrests installed on typical business class seats of identical overall width (comparison).
Figure 6B:
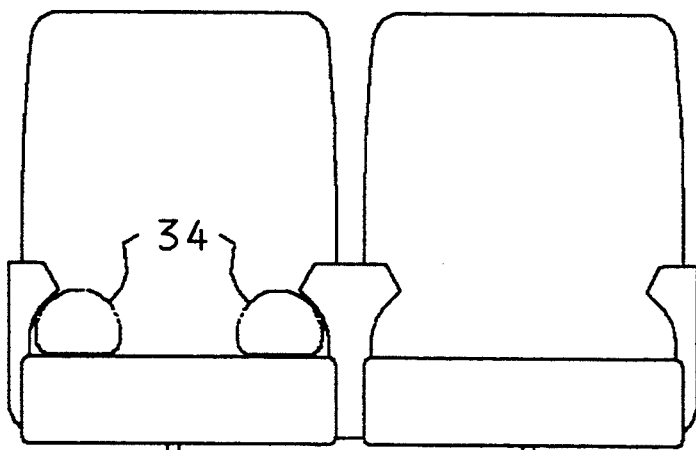
Figure 6C:
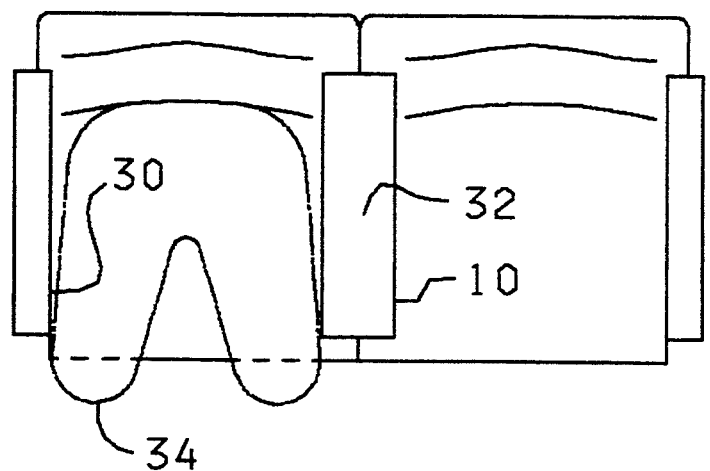
FIGS. 6C and 6D show the top view of traditional previous art and new armrests installed on typical business or first class double seats (comparison).
Figure 6D:
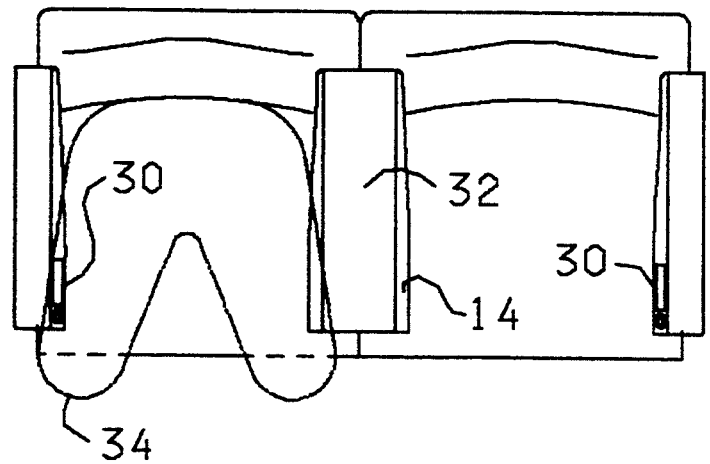
Figure 7A:
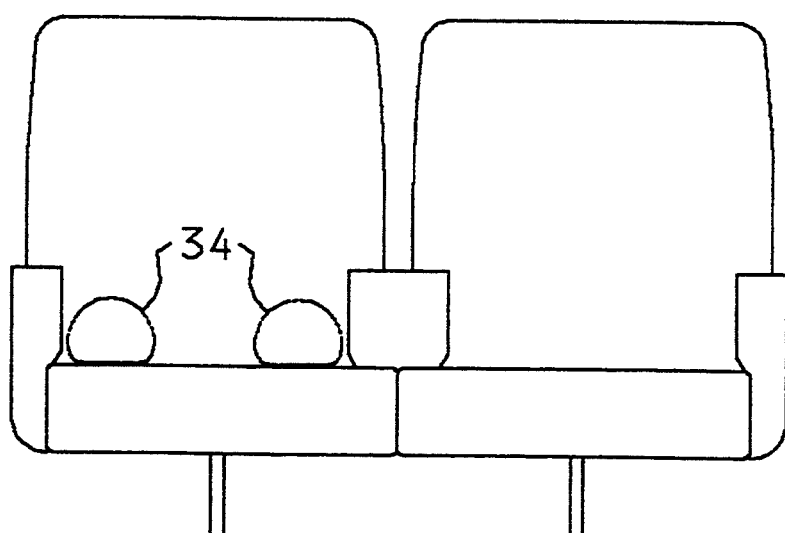
FIGS. 7A and 7B show front view of traditional previous art and new armrests installed on typical first class seats of identical overall width (comparison).
Figure 7B:
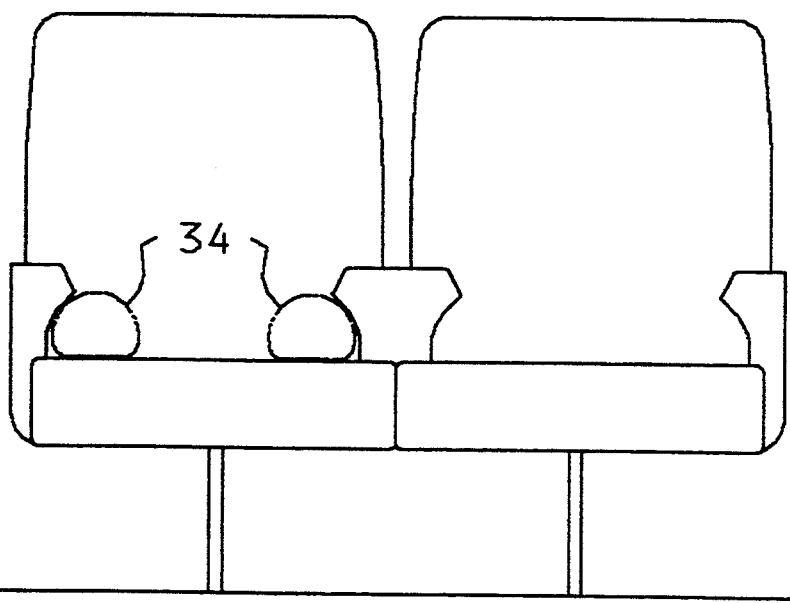
Figure 8A:
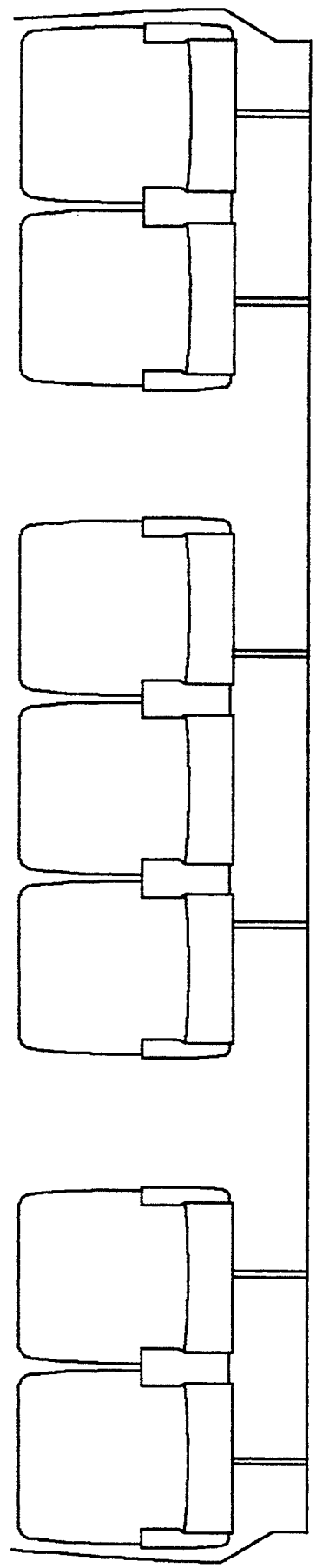
FIGS. 8A and 8B show airline aircraft cabin sections with front view of passenger seats equipped with a traditional and the new diamond shape armrests (comparison).
Figure 8B:
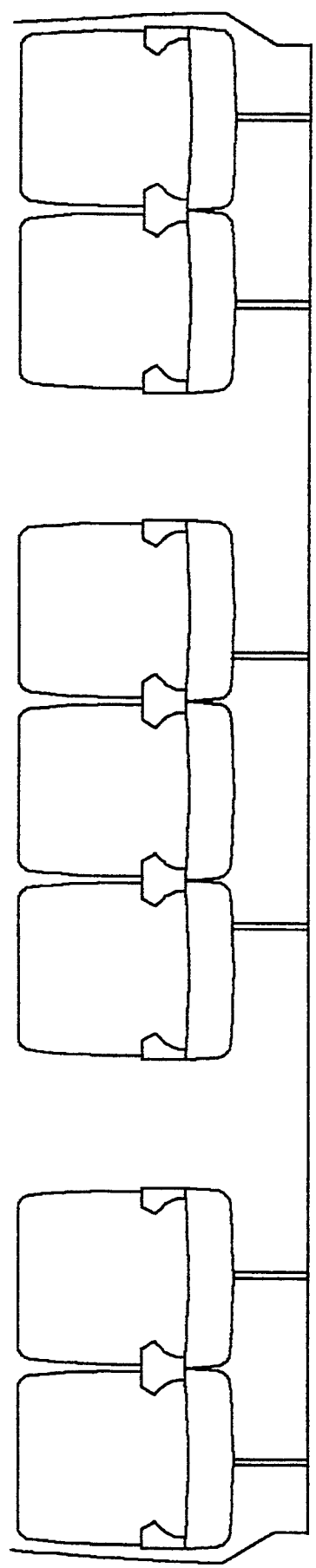

The new distinctive design of the diamond shape armrest is intended for application on all airline seats: tourist FIG. 5B, business FIG. 6B, and first class passenger seats FIG. 7B. The only difference will be in the width of armrests as shown on submitted drawings FIG. 3 and FIG. 4.

A typical triple airline seat has six walls affected by this change generating amplified and unexpected results. Armrests and seat bottom cushions will look and feel wider without the necessity of stretching the overall width of the seat. Examples of stretchable seats may be found in both U.S. patents mentioned earlier (U.S. Pat. Nos. 4,881,702 and 3,893,729). Both patents describe a convertible seat capable of being stretched to increase effective dimension between the armrests. One patent ('729) even covers a center armrest that may change its width by use of a plug-in tray which is stowed outside as a loose part. Another example of stretchable center armrest can be found in U.S. Pat. No. 3,926,473 by Hogan.

Convertible airline seats would typically deliver a two-inch width increase between armrests (from 17 to 19 inches) which is exactly the same increase of legroom available with the use of new diamond shape armrests covered by this patent application. The benefit is in the fact that a complicated "stretch" mechanism is not utilized and the new armrests are also wider on the top (unlike the narrow two-inch wide armrests in a standard convertible seat).

Based on long-term professional experience in the design of the aircraft seats, it is believed that this invention provides a new appearance and comfort that is significantly different from anything heretofore designed. The high degree of novelty is in the fact that a relatively small modification of the armrest side wall surface will generate great new results in the whole seat and in general aircraft cabin comfort. The aesthetic aspects are also enhanced at the same time by creating a new overall cabin appearance image as shown on FIG. 8B.

Another advantage of the new design is in the minimal cost of implementation to achieve all benefits listed above. The new wall shape can be constructed at a similar cost as the previous vertical walls. This was not suggested in the prior patents discussed above.

In summary, besides better looks, wider armrests and more legroom this invention provides few more advantages which were not appreciated before. Passengers will realize the benefits of a much better exposure of seat control units (PCU) which are now more conveniently located and easily accessible for operation and viewing, when installed on the upper sloping surface of the new armrest. PCU's were completely hidden from the view and poorly accessible when installed on the prior art vertical walls and facing toward the leg of sitting passenger. Previous location causes even more pinching of legs and is prone to accidental activation of the control buttons.

The introduction of three arm support surfaces instead of the previous single rest surface shared by two adjoining passengers shall be also appreciated by all passengers, especially those in the tourist class section. Please compare FIGS. 5A and 5B, two-inch versus four-inch center armrest, ref. Most of the previous armrests look narrow and are actually narrow. This is partially because some airline management is reluctant to provide wider seats with wider armrests as this could reduce revenues (at least according to traditional industry practice). Thus the reader will see that the new diamond shaped armrests will help to satisfy the needs of passengers while permitting airline management to retain the same number of seats per cabin section.

Although the description above and drawings submitted contain many specifics, these should not be construed as limiting the scope of this invention but as merely providing illustrations of some of the presently preferred embodiments of this innovation. For example, the sloping wall may be slightly crowned or on a different angle than shown, and the curved cutout near leg may not be formed by a smooth radius as shown. The new contour may be constructed from other shape elements as oval, elliptical, trapezoidal or similar cross-sections. Thus the scope of this invention should be determined by the appended claims and their legal equivalents, rather by the examples given.

I claim:

1. An improved armrest assembly having at least one armrest with a top wall and side walls, for use in an aircraft passenger seat, the improvement comprising:
   (a) said armrest having at least one upper sloping side wall surface starting near an upper edge of said top wall, wherein said upper sloping wall surface diverges from said top wall and extends outwardly and downwardly toward the approximate center of a seat occupant's leg when seated, said upper sloping side wall housing a seat control button or a passenger control unit;
   (b) at least one lower curved side wall surface positioned below and integral with said upper sloping side wall surface, wherein said lower curved side wall surface extends inwardly and downwardly due to a substantial cutout, said cutout having a curvature generally conforming to the outside shape of the seat occupant's leg;
   (c) wherein the armrest side wall surfaces form a cross-section resembling a semi diamond shape for an outboard armrest and a full diamond shape for a center armrest, such shapes being independent of any adjustable mechanism of variable geometry;
   whereby said armrests having the semi-diamond and full diamond shapes provide more leg room for passengers measured in the lateral direction between the armrests and provide a substantially wider armrests measured near said top wall; and the upper sloping side wall surface providing a more convenient, angular exposure of the seat control button or passenger control unit.

2. An armrest assembly as recited in claim 1 wherein said upper sloping wall surface extends at an approximately 60 degree slope for approximately one inch.

3. An armrest assembly as recited in claim 1 wherein said lower curved side wall surface of each armrest curves inwardly for approximately one inch underneath the upper sloping wall surface to a bottom portion of the armrest resulting in a combined two inch increase in leg room measured laterally, one inch per side, without the necessity to increase the overall width of the seat.

4. An improved airline passenger's seat outboard armrest having redesigned inboard side wall profile shape to resemble a semi-diamond shape in cross-section comprising
   (a) a relatively narrow lower support section having a generally vertical lower side wall portion in front area near a seat bottom cushion level;
   (b) said vertical lower side wall merging upwardly into a generally semi-diamond shaped upper section positioned immediately above and comprising a wall portion angling inward and upward above the passenger leg surface to form the underside of an arm rest section of broader width on top than in the lower support section;

(c) wherein said semi-diamond upper section further including an outward and upward extending angled arm rest surface and another substantially flat horizontal surface on top;

whereby said armrest provides:

(d) a narrow lower support section near seat bottom cushion to provide more leg room under said semi-diamond section;

(e) a smooth transition region to follow the curvature of the outboard side of passenger's leg above knee;

(f) an outwardly angled arm rest surface for providing alternate angular support for passenger's arm in addition to a horizontal support surface on top of said armrest.

5. An improved airline passenger's seat as recited in claim 4, wherein the opposite side of the outboard armrest is a mirror image of the respective side wall surfaces to form a symmetrical and generally full diamond shape upper section on top of the relatively narrow support section to provide the same features on both sides for two passengers sharing a single center armrest between.

6. An improved airline passenger's seat outboard armrest as recited in claim 4 or claim 5 wherein said lower support section is removed above the seat bottom cushion level and below said upper semi-diamond or full diamond section and further including a rear support attachment to the seat base structure.

7. An improved airline passenger's seat armrest as recited in claim 4 or 5 further including a passenger operated control panel and buttons located on said outward and upward extending angled upper sloping wall surface for easy viewing, convenient access and operation by the passenger.

* * * * *